(12) United States Patent
Abe et al.

(10) Patent No.: US 7,796,710 B2
(45) Date of Patent: Sep. 14, 2010

(54) DIGITAL SIGNAL DEMODULATOR AND WIRELESS RECEIVER USING THE SAME

(75) Inventors: Kazuhide Abe, Kawasaki (JP);
Michihiko Nishigaki, Kawasaki (JP);
Toshihiko Nagano, Kawasaki (JP);
Takashi Kawakubo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1315 days.

(21) Appl. No.: 11/268,615

(22) Filed: Nov. 8, 2005

(65) Prior Publication Data
US 2006/0103561 A1 May 18, 2006

(30) Foreign Application Priority Data
Nov. 10, 2004 (JP) ............................... 2004-326810

(51) Int. Cl.
*H04L 27/22* (2006.01)
(52) U.S. Cl. .................. 375/329; 375/304; 375/306; 375/322; 375/324; 375/325; 375/326; 455/45.1; 455/193.1; 455/257; 455/259; 329/304; 329/305; 329/306; 329/345; 329/346; 341/172
(58) Field of Classification Search ................ 375/304, 375/306, 322, 324–326, 329; 455/41.1, 193.1, 455/257, 259; 329/345–346, 304–306; 341/172
See application file for complete search history.

(56) References Cited

U.S. PATENT DOCUMENTS 6,703,921 B1 * 3/2004 Wuidart et al. ............. 340/10.4

| | | | |
|---|---|---|---|
| 7,003,276 B2 * | 2/2006 | Muhammad et al. | 455/323 |
| 2003/0050027 A1 * | 3/2003 | Muhammad et al. | 455/257 |
| 2004/0198288 A1 * | 10/2004 | Sadowski | 455/259 |
| 2005/0009485 A1 * | 1/2005 | Tanaka | 455/193.1 |

(Continued)

FOREIGN PATENT DOCUMENTS

EP 0781013 * 6/1997

(Continued)

OTHER PUBLICATIONS

K. Muhammad, et al., "A Discrete-Time Bluetooth Receiver in a 0.13μm Digital CMOS Process", IEEE International Solid State Circuits Conference, ISSCC 2004, Digest of Technical Papers, Session 15, Wireless Consumer ICs/15.1, Feb. 17, 2004, 10 Pages.

*Primary Examiner*—Mohammad H Ghayour
*Assistant Examiner*—Eboni Giles
(74) *Attorney, Agent, or Firm*—Oblon, Spivak, McClelland, Maier & Neustadt, L.L.P.

(57) ABSTRACT

A digital demodulator includes a resonator having a resonance frequency same as a carrier frequency to store a charge corresponding to a digital signal modulated by phase shift keying, a capacitor to store the charge of the resonator, an amplifier including an input node and an output node between which the capacitor is connected to convert a stored charge of the capacitor into a voltage signal, and a controller configured to accumulate in the resonator the charge induced by the frequency signal modulated by phase shift keying in a first control mode and configured to transfer the charge of the resonator to the capacitor in a second control mode, to output the voltage signal corresponding to the stored charge of the capacitor from the output node of the amplifier.

20 Claims, 16 Drawing Sheets

U.S. PATENT DOCUMENTS

2005/0059375 A1    3/2005    Abe et al.

FOREIGN PATENT DOCUMENTS

| EP | 0781013 A2 * | 6/1997 |
|---|---|---|
| JP | 63-139451 | 6/1988 |
| JP | 02-051931 | 2/1990 |
| JP | 09-181783 | 7/1997 |
| JP | 11-230706 | 8/1999 |
| JP | 2000-341171 | 12/2000 |
| JP | 2002-359542 | 12/2002 |
| JP | 2004-128738 | 4/2004 |
| JP | 2005-45405 | 2/2005 |

* cited by examiner

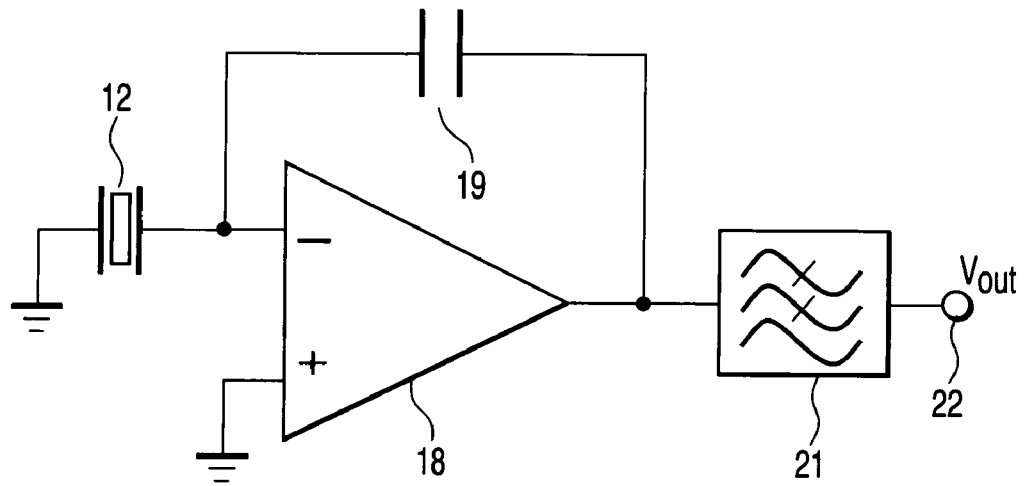
F I G. 6
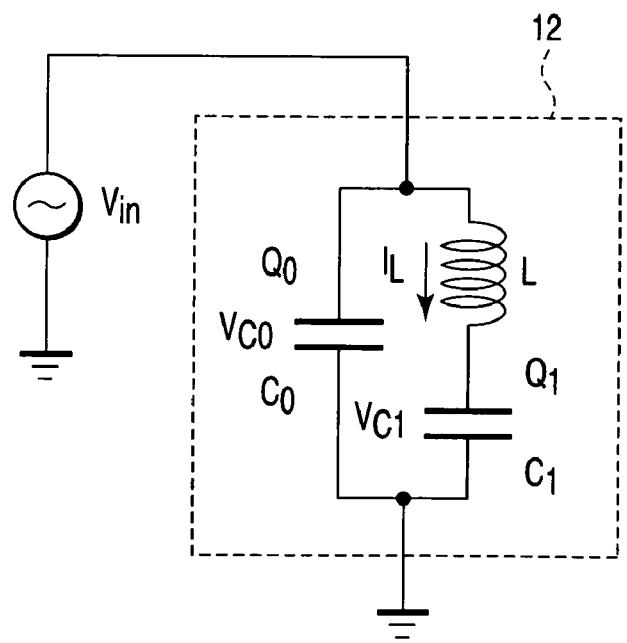
F I G. 7

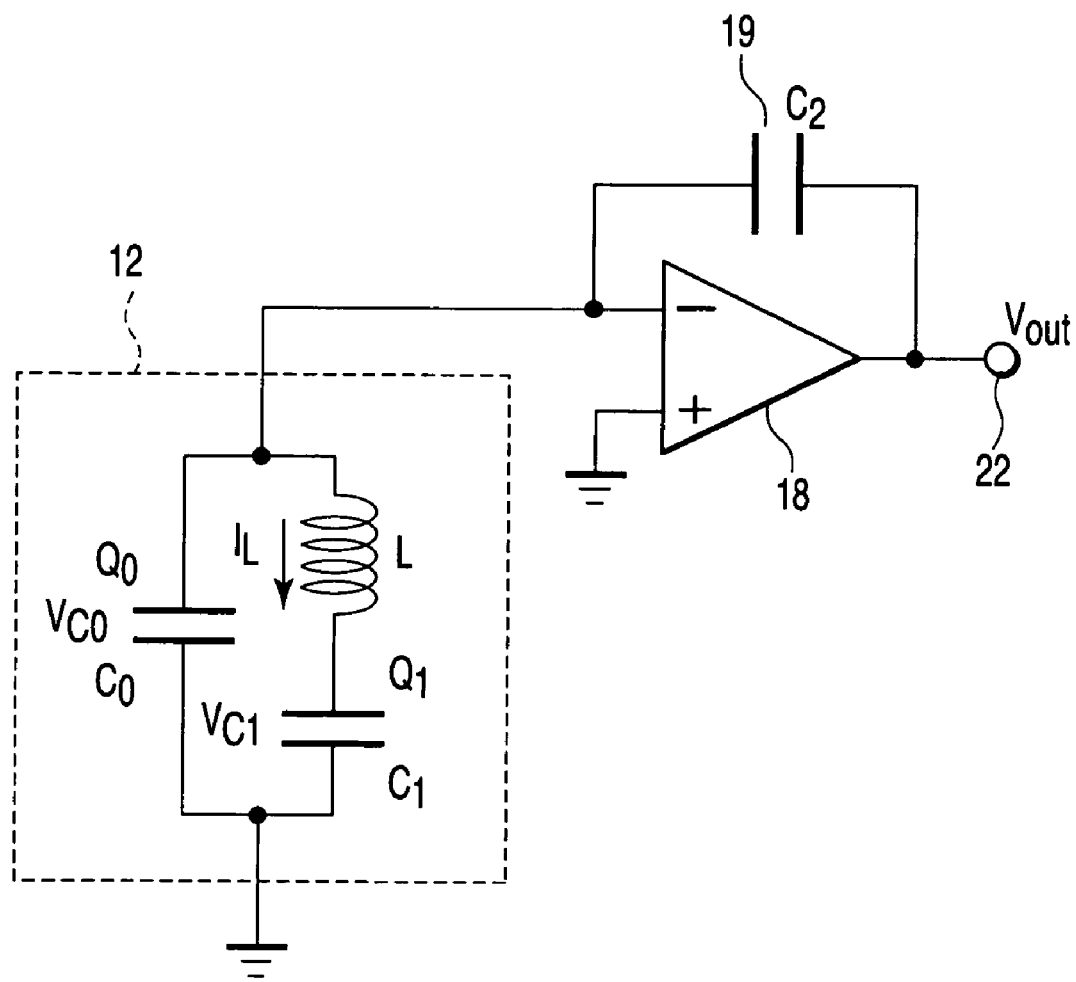
F I G. 10

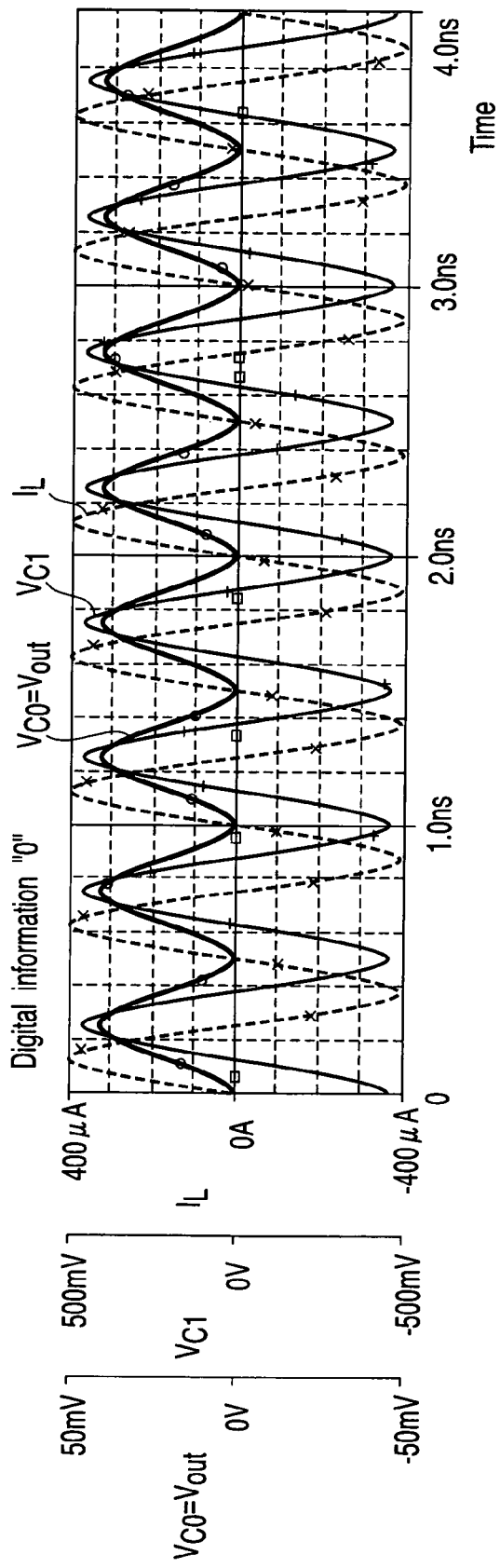
F I G. 11

DIGITAL SIGNAL DEMODULATOR AND WIRELESS RECEIVER USING THE SAME

CROSS-REFERENCE TO RELATED APPLICATIONS

This application is based upon and claims the benefit of priority from prior Japanese Patent Application No. 2004-326810, filed Nov. 10, 2004, the entire contents of which are incorporated herein by reference.

BACKGROUND OF THE INVENTION

1. Field of the Invention

The present invention relates to a digital signal demodulator that directly converts radio frequency signal modulated by phase shift keying to a digital signal and a wireless receiver using the same.

2. Description of the Related Art

In recent years, a mobile communication appliance such as portable cellar telephone is sophisticated in a service in accordance with rapid market expansion. The spread of wireless LAN systems realizing a high-speed data transfer by wireless is also remarkable. Generally, in such wireless communication systems, the digital modulation scheme using the high carrier wave of a GHz band is used.

The digital modulation scheme can be classified into amplitude shift keying (ASK), a phase shift keying (PSK), and a frequency shift keying (FSK). Among them, the phase modulation scheme represented by PSK that uses phase of a carrier wave for digital signal modulation is the most commonly used. Receiver circuits for receiving and demodulating a high frequency signal can be classified roughly in a heterodyne scheme and a direct conversion scheme.

In a conventional technique, a band selection filter is used for filtering a specific frequency band referred to as a system band in the receiver of either scheme. The system band is a frequency band assigned to a user based on a certain communication standard. The system band contains a plurality of channel bands of a narrower band width, each of which is assigned to each user.

In a conventional receiver, at first, the received high frequency signal is passed through the band selection filter to select the system band, and then converted into a signal of an intermediate frequency band or baseband with a down-converter. The received signal subjected to the frequency conversion is further converted into a digital signal with an AD converter. The digital signal is subjected to a digital signal process or passed through a digital filter to extract only a digital signal included in the channel band assigned to every user.

The above conventional receiver requires analog circuits for processing a high frequency signal such as a down converter as well as a band selection filter and a channel selection filter, resulting in a complicated and large-scale circuit. Such a complicated circuit configuration is required because it is impossible to realize a simple demodulator configuration which can extract directly a demodulated output digital signal from high frequency signal with a GHz band carrier without using a filter or a down-converter mixer circuit.

On the other hand, there has been developed a receiving IC capable of directly sampling and demodulating a received signal of 2.4 GHz using a CMOS device which is used for a digital signal process or for a logic circuit as described in IEEE International Solid State Circuit Conference (ISSCC2004) Digest of Technical Papers, pp. 268-269.

The above receiving IC can directly demodulate a high frequency signal of 2.4 GHz into a digital signal. However, since the receiving IC does not provide function for extracting a specific frequency component from the received signal, it is still requires a channel selection filter.

It is an object of the present invention to provide a digital demodulator capable of demodulating a radio frequency signal modulated by phase shift keying into digital signal with a simple circuit configuration, and a receiver providing with the same.

BRIEF SUMMARY OF THE INVENTION

An aspect of the present invention provides a digital signal demodulator of demodulating a frequency signal modulated by phase shift keying and having a specific carrier frequency, the digital demodulator comprising: a resonator having a resonance frequency same as a carrier frequency to store a charge corresponding to a digital signal modulated by phase shift keying; a capacitor to store the charge of the resonator; an amplifier including an input node and an output node between which the capacitor is connected to convert a stored charge of the capacitor into a voltage signal; and a controller configured to accumulate in the resonator the charge induced by the frequency signal modulated by phase shift keying in a first control mode and configured to transfer the charge of the resonator to the capacitor in a second control mode, to output the voltage signal corresponding to the stored charge of the capacitor from the output node of the amplifier.

BRIEF DESCRIPTION OF THE SEVERAL VIEWS OF THE DRAWING

FIG. 6 is an equivalent circuit schema of the digital demodulator of FIG. 1 in a readout mode.

FIG. 7 is a circuit schema of a simulation circuit for examining an operation of the digital demodulator of FIG. 1 in the sampling mode.

FIG. 10 is a circuit schema of a simulation circuit for examining an operation of the digital demodulator of FIG. 1 in the readout mode.

FIG. 11 is a diagram showing waveforms of respective parts of the simulation circuit of FIG. 10 in the case of phase $\phi=0$ in the readout mode.

DETAILED DESCRIPTION OF THE INVENTION

There will now be described an embodiment of the present invention with reference to the drawings.

First Embodiment

Figure 1:
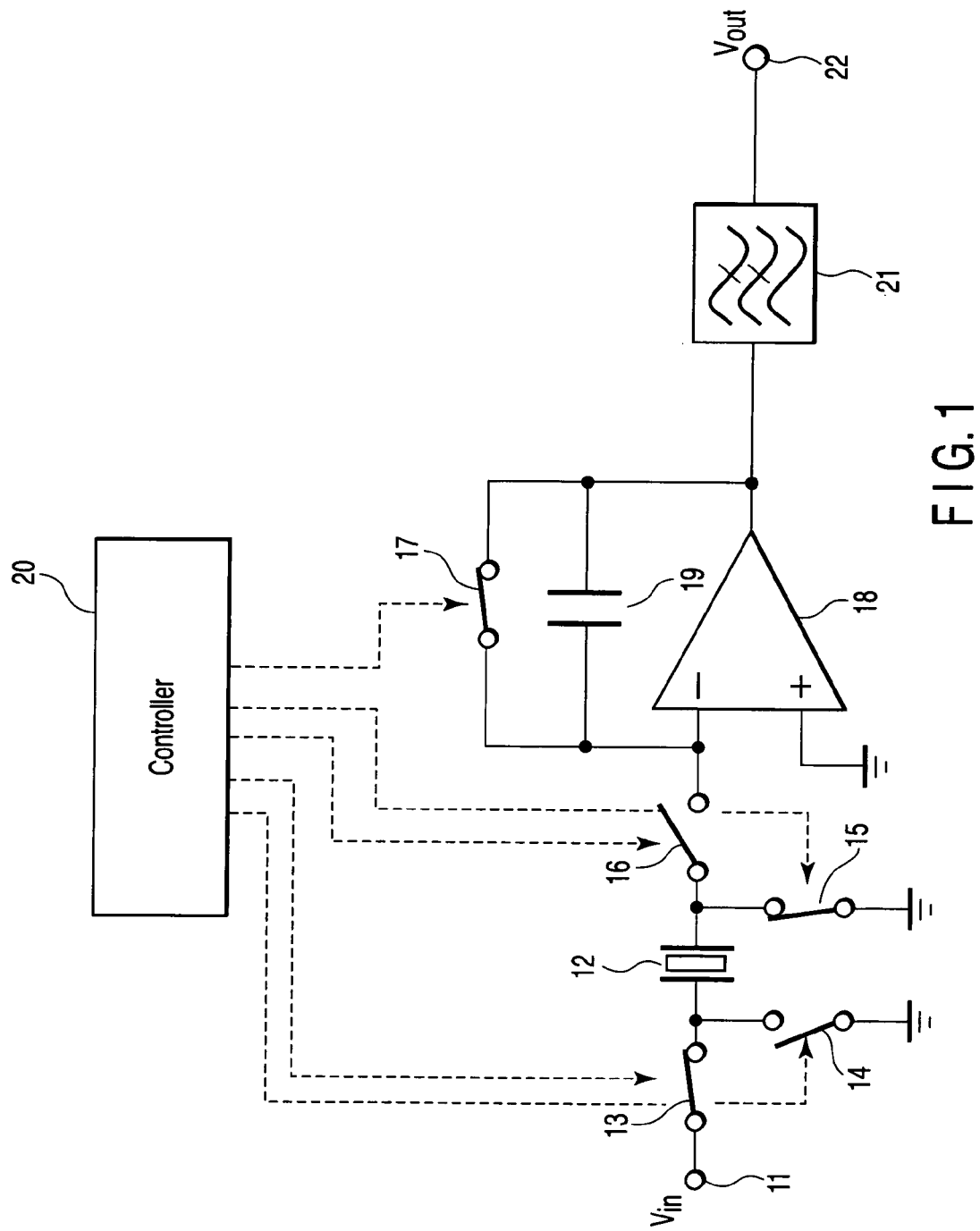
FIG. 1 is a circuit schema of a digital modulator according to a first embodiment of the present invention.

The digital demodulator according to the first embodiment of the present invention shown in FIG. 1 is preferable for demodulation of a high frequency signal modulated by phase shift keying using a carrier wave of, for example, a GHz band. For example, a binary phase shift keying (BPSK) signal can be provided as a representative digitally modulated signal by phase. In the BPSK signal, as shown in FIG. 2, a digital signal is modulated so that the phase of the carrier wave becomes 0 or n in correspondence with a symbol of one bit signal of "0" or "1".

Figure 2:
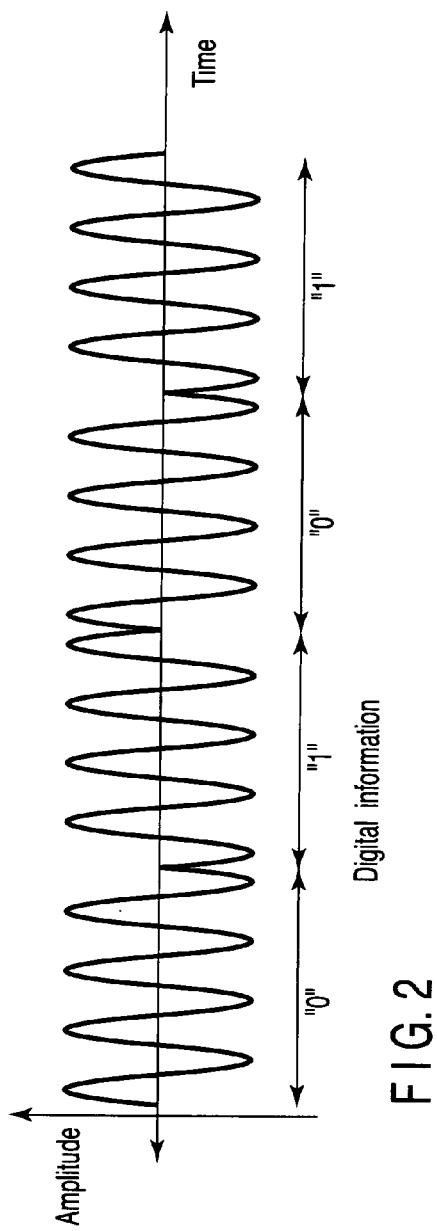
FIG. 2 is a diagram showing an example of a BPSK (Binary Phase Shift Keying) signal waveform.

In the digital demodulator shown in FIG. 1, a digital signal modulated by phase shift keying, for example, a BPSK signal shown in FIG. 2 is supplied to a input port 11 as symbolized by Vin. The signal port 11 is connected to a node of a switch 13, and the other node of the switch 13 is connected to one node of a resonator 12 and one node of a switch 14. The other node of the switch 14 is connected to the ground as a reference potential port. The other node of the resonator 12 is connected to one node of a switch 15 and one node of a switch 16. The other node of the switch 15 is connected to the ground.

The other node of the switch 16 is connected to an inverting input node of a differential amplifier 18. A noninverting input node of the differential amplifier 18 is connected to the ground. A switch 17 and a capacitor 19 are connected in parallel between the inverting input node and output node of the differential amplifier 18. The switches 13-17 comprise CMOS switches, and are on/off-controlled by a control signal from a switch controller (or control signal generator) 20. The switch 13-17 and switch controller 20 comprise a controller to control a demodulation operation.

The resonator 12 comprises a resonator using a piezoelectric resonance such as a film bulk acoustic resonator (FBAR) or a surface acoustic wave resonator (SAW) or a MEMS resonator or a LC resonator configured with an inductor and a capacitor. An example using a FBAR for the resonator 12 will be described hereinafter.

Figure 4:
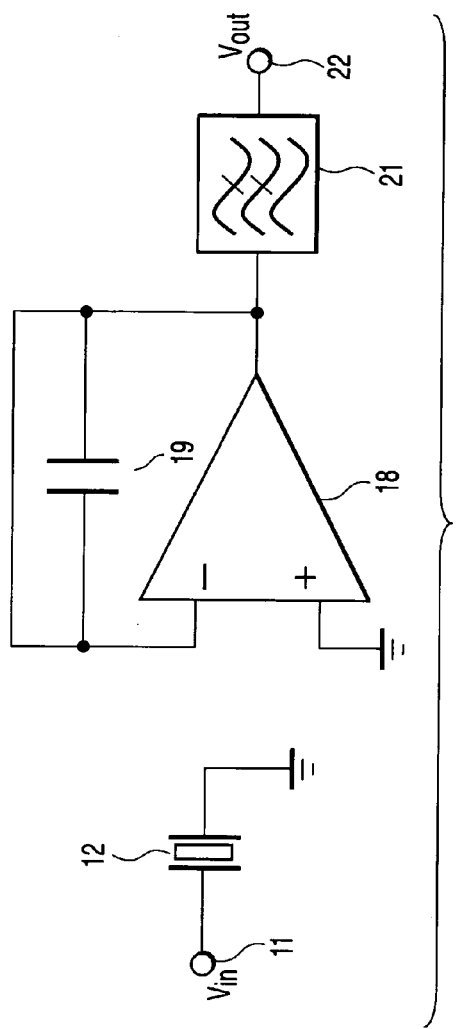
FIG. 4 is an equivalent circuit schema of the digital demodulator of FIG. 1 in a sampling mode.
Figure 3:
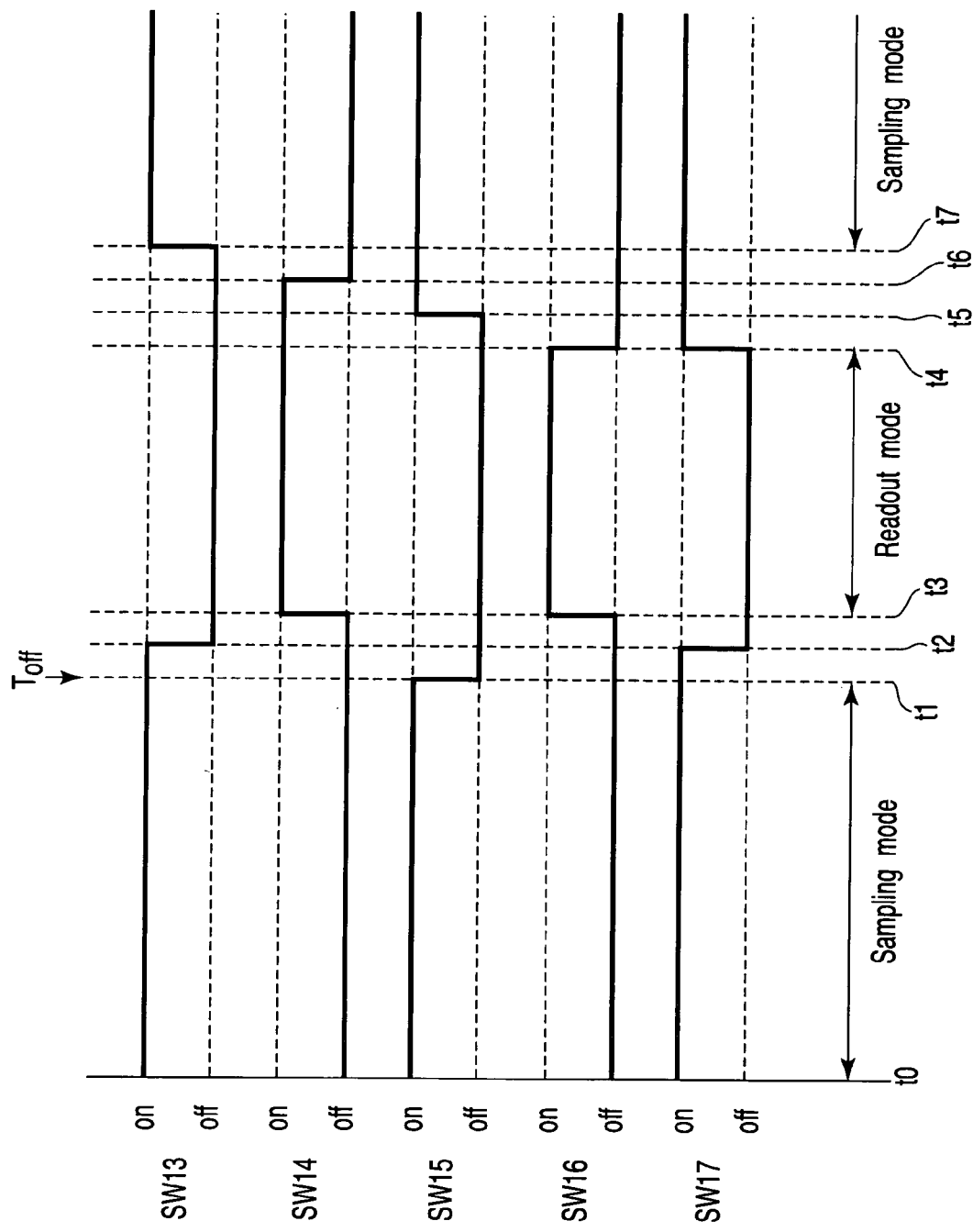
FIG. 3 is a timing chart for explaining an operation of the digital demodulator of FIG. 1.

The operation of the digital demodulator of FIG. 1 is described in conjunction with FIGS. 3 and 4. FIG. 3 shows timing charts of an on-off action for the switches 13-17 based on a control signal from the switch controller 20. At first, the switch controller 20 turns on the switches 13, 15 and 17, and turns off the switches 14 and 16 at time t0. Then, the digital demodulator of FIG. 1 can be represented by the equivalent circuit shown in FIG. 4.

In other words, the one node of the resonator 12 is connected to the signal input node 11 through the switch 13, and the other node of the resonator 12 is connected to the ground through the switch 14. On the other hand, the switch 17 short-circuits between the inverting input node and output node of the differential amplifier 18 and between both nodes of the capacitor 19. As a result, the stored charges of the capacitor 19 are discharged and thus the potential difference between both nodes of the capacitor 19 becomes zero. Accordingly, the output voltage of the differential amplifier 18 becomes zero. In this condition, the resonator 12 and the differential amplifier 18 are disconnected from each other with the switch 16.

The first control mode in which the switch controller 20 makes the digital demodulator of FIG. 1 into a equivalent state of FIG. 4 is referred to as a "sampling mode". Assume that a potential difference between both nodes of the resonator 12 is zero and piezoelectric oscillation of the resonator 12 damps enough in an initial state.

Figure 5A:
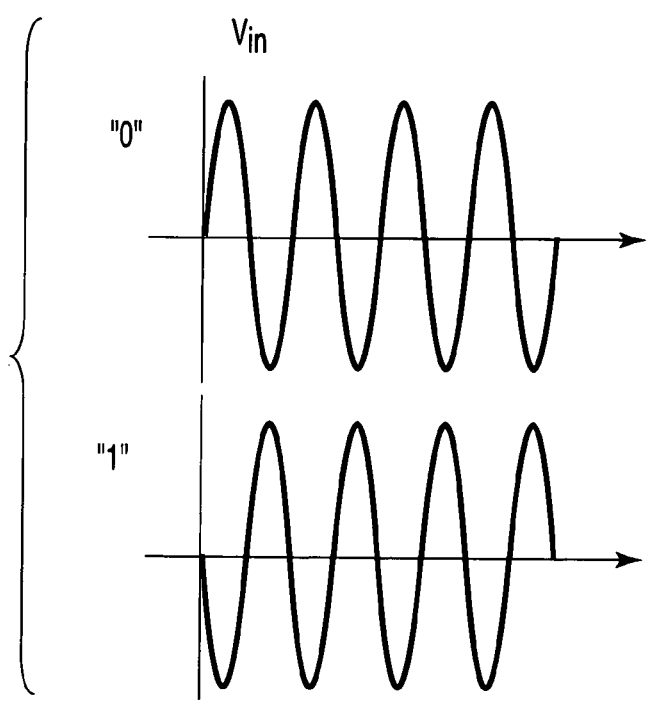
FIGS. 5A and 5B are diagrams showing an input signal waveform and a waveform of stored charges of a resonator in the sampling mode of the digital demodulator of FIG. 1.
Figure 5B:
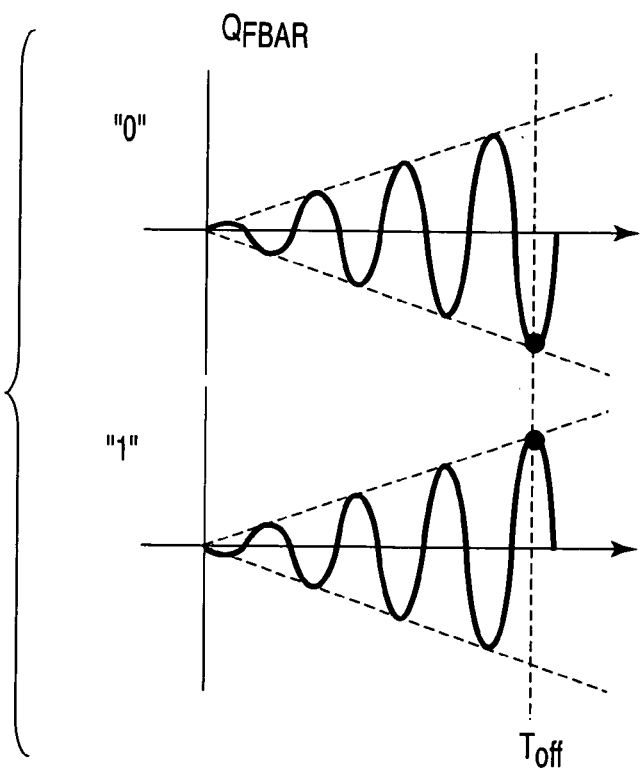

FIGS. 5A and 5B show a waveform of an input signal Vin in the sampling mode and a waveform of the charges QFBAR stored in the resonator 12 by being excited by the input signal Vin, respectively. As shown in FIG. 5A, the phase of the input signal Vin differs by n according to a symbol "0" or "1" of digital information transmitted together with the digital modulated signal corresponding to the input signal Vin.

When the frequency of the input signal V coincides with the resonance frequency of the resonator 12, the piezoelectric vibration (in accordance with elastic variation) of the resonator 12 is excited by the input signal Vin, and the amplitude of the piezoelectric vibration gradually increases. As a result, the amplitude of the stored charges QFBAR of the resonator 12 gradually increases as shown in FIG. 5B. In other words, the energy of the input signal Vin is gradually accumulated in the resonator 12. As is apparent from FIG. 5B, the phase of the amplitude of the charges QFBAR accumulated in the resonator 12 differs by n according to whether a symbol of digital information is "0" or "1" similarly to the input signal Vin shown in FIG. 5A.

The switch controller 20 turns off the switch 15 at a time point at which the amplitude of charges QFBAR accumulated in the resonator 12 becomes large enough, for example, a time t1 corresponding to a timing indicated by Toff in FIG. 5B to finish the sampling mode. The timing Toff at which the amplitude of charges QFBAR accumulated in the resonator 12 becomes large enough can be determined beforehand. The timing Toff is set by the switch controller 20 at the time t1 indicated in the timing chart FIG. 3.

When the switch 15 turns off at the time t1, the other node of the resonator 12 is disconnected from the ground potential. In this time, the charges accumulated in the resonator 12 are held in the resonator 12 without being discharged. Accordingly, even if the piezoelectric vibration of the resonator 12 damps, a certain quantity of charges are held in the resonator 12. The polarity of charges held in the resonator 12 is reversed according to whether a symbol of digital information corresponding to the phase of the input signal Vin is "0" or "1". In the case that the switch 15 is turned off at a timing shown by Toff in FIG. 5B, when the symbol of the digital information is "0", negative charges are held in the resonator 12, whereas when the symbol is "1", positive charges are held in the resonator 12.

The switch controller 20 turns off the switches 13 and 17 at a time t2 elapsed by a given time period from the time t1. In other words, all of the switches 13-17 are turned off. In this time, both nodes of the resonator 12 are disconnected from a specific electric potential, and become a floating state with the absolute potential remaining undetermined, so that dc components of the charges (dc potential difference) remain in the resonator 12. On the other hand, the capacitor 19 is released in a state of zero charge.

Subsequently, the switch controller 20 turns on the switches 14 and 16 at a time t3 elapsed by a given time from the time t2. In this case, the digital demodulator of FIG. 1 is represented by an equivalent circuit schema shown in FIG. 6. The second control mode that the switch controller 20 makes the digital demodulator of FIG. 1 into a equivalent state of FIG. 6 is referred to as a "readout mode".

In the readout mode, the left side node of the resonator 12 is forced to drop to the ground potential with the switch 14. On the other hand, the inverting input node and noninverting input node of the differential amplifier 18 are virtually shorted due to feedback via the capacitor 19. Therefore, the right side other node of the resonator 12 comes to a virtual ground state and is equal to a ground potential. In other words, because the potential difference between both nodes of the resonator 12 becomes substantially zero, the resonator 12 cannot store any charges. This is equal to the initial state of the sampling mode in dc.

Because there is not a path for discharging the charges accumulated in the electrode of the right side node of the resonator 12, the charges move to the capacitor 19. As a result, a voltage proportional to the charges accumulated in the capacitor 19 is obtained from an output node of the operational amplifier 18. In other words, the operational amplifier 18 converts the charges of the capacitor 19 into a voltage signal. More specifically, a voltage signal including a dc component of the polarity according to the phase information of a signal integrated with the resonator 12 is obtained with the operational amplifier 18 and capacitor 19. Accordingly, when the dc component is extracted from the output signal of the operational amplifier 18 with the lowpass filter 21, a dc voltage different in polarity according to the symbol "0" or "1" of digital information can be output as a demodulated output signal Vout from the signal output node 22.

Subsequently, the switch controller 20 turns off the switch 16 at a time t4 elapsed by a given time from the time t3 to disconnect the resonator 12 from the operational amplifier 18, and turn on the switch 17 to short-circuit both nodes of the capacitor 19, resulting in discharging the capacitor 19 and finishing the readout mode.

The switch controller 20 turns on the switch 15 at a time t5, and then turns off the switch 14 at a time t6 and turns off the switch 13 at a time t7. As a result, the sampling mode is restarted to repeat the above steps.

The operation of the digital demodulator of FIG. 1 is explained quantitatively using a result of circuit simulation.

FIG. 7 shows a simulation circuit for examining an operation in the sampling mode. This circuit corresponds to the resonator 12 on the left side circuit of two circuits separated by turn-off of the switch 16 in FIG. 1, in the equivalent circuit in the sampling mode as shown in FIG. 4. The resonator 12 comprises a resonance circuit formed of capacitors C0 and C1 and an inductor L as shown in FIG. 7. The amplitude and frequency of the input signal Vin are assumed to be 1 mV and 2.00 GHz. A serial resonating frequency of the resonator 12 is set to a value equal to the frequency of the input signal Vin. Constants of the elements of the resonator 12 are assumed to be C0=1.59 pF, C1=0.069 pF, L=93.3 nH.

Figure 8:
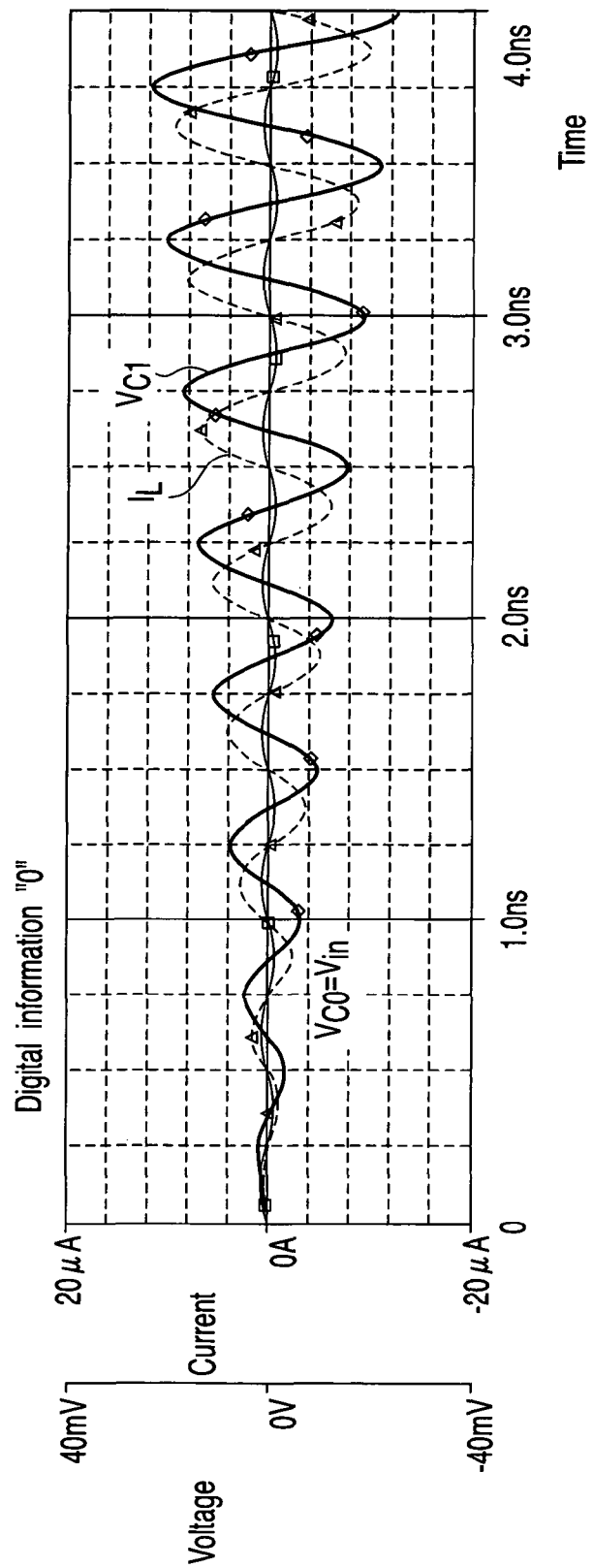
FIG. 8 is a diagram showing waveforms of respective parts of the simulation circuit of FIG. 7 in the case of phase $\phi=0$ in the sampling mode.
Figure 9:
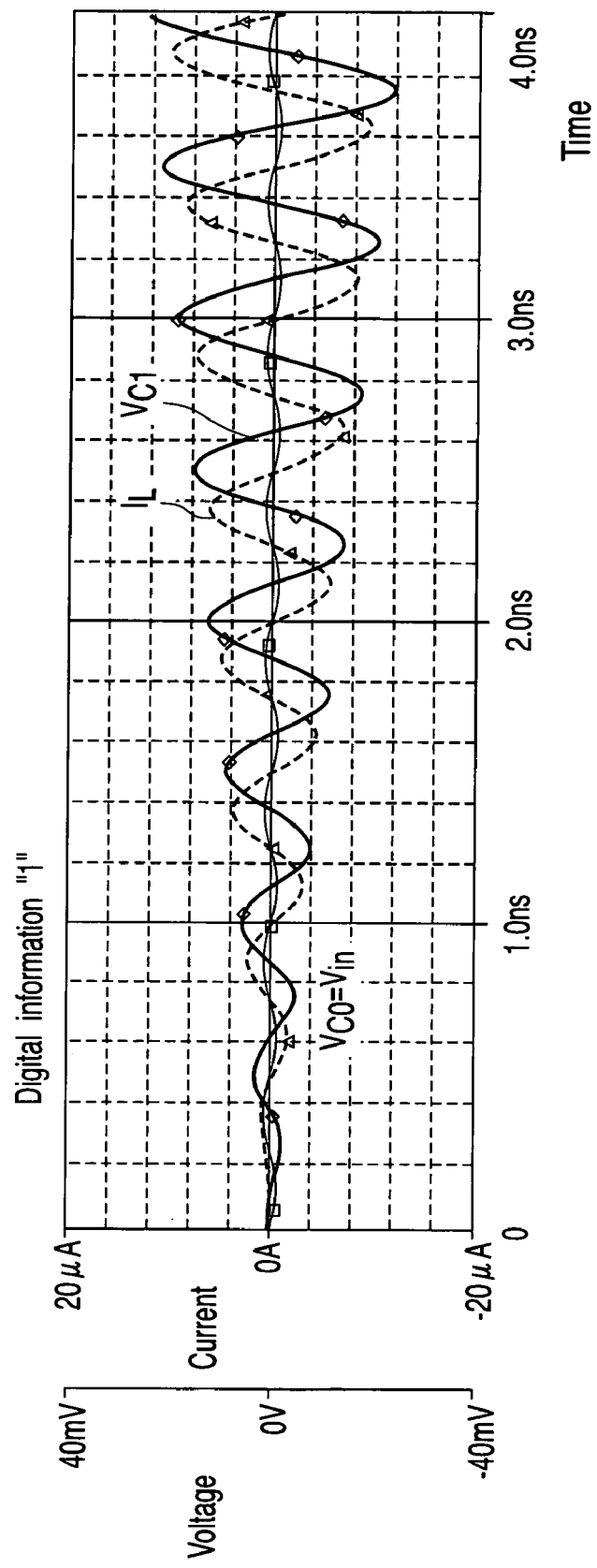
FIG. 9 is a diagram showing waveforms of respective parts of the simulation circuit of FIG. 7 in the case of phase $\phi=\pi$ in the sampling mode.

FIGS. 8 and 9 show waveforms of the input signal Vin, the node-to-node voltage VC1 of the capacitor C1 and the current IL flowing through the inductor L, which are provided with the circuit simulation of FIG. 7 in the sampling mode. In the sampling mode, the node-to-node voltage VC0 of the capacitor C0 is equal to the voltage waveform of the input signal Vin. The amplitude of the node-to-node voltage VC0 of the capacitor C0 is always constant with respect to a time, but the amplitudes of the node-to-node voltage VC1 of the capacitor C1 and current IL flowing through the inductor increase according to lapse of the time. This shows that the energy of the input signal Vin is accumulated in the resonator 12 gradually because the frequency (2 GHz) of the input signal Vin is equal to the series resonating frequency of the resonator 12.

FIGS. 8 and 9 show the voltage waveforms corresponding to difference phases $\phi$ of the input signal Vin, respectively. In other words, FIG. 8 shows that the phase of the input signal Vin at a time "0" is $\phi$=0. FIG. 9 shows that the phase of the input signal Vin at a time "0" is $\phi$=$\pi$. In other words, the phase p takes 0 or n in correspondence with the symbol I"0" or "1" of digital information transmitted by the BPSK signal.

As shown in FIGS. 8 and 9, waveforms concerning the resonator 12, namely the waveform of the node-to-node voltage VC1 of the capacitor C1 and the waveform of the current IL flowing through the inductor L differ by $\phi$ in phase from each other. If the waveform of VC1 shown in FIG. 8 is compared with that shown in FIG. 9 at each of, for example, times 1.0 nS, 2.0 nS, 3.0 nS and 4.0 nS, in FIG. 8, $\phi$=$3\pi/2$ and the voltage becomes minimum, and in FIG. 9, $\phi$=$\pi/2$ and the voltage become maximum. The waveform of current IL flowing through the inductor L indicates a current value 0 in both of FIGS. 8 and 9 because the phase is $\phi$=0 or $\pi$ at each of the times 1.0 nS, 2.0 nS, 3.0 nS and 4.0 nS.

FIG. 10 shows a simulation circuit schema for examining a circuit operation in the readout mode, which corresponds to a circuit that the lowpass filter 21 is removed from the equivalent circuit in the readout mode as shown in FIG. 6. Assume that the circuit constants of the capacitors C0 and C1 and inductor L of the resonator 12 shown in FIG. 10 are equal to those of the resonator of FIG. 7. The initial value of the voltage or current concerning the capacitors C0 and C1 and inductor L is set by assuming that the circuit of FIG. 10 is operated to t3=100 nS in the sampling mode, and the switches 14 and 16 are turned on at the moment when the time reaches 100 nS to change the mode to the readout mode. In other words, the node-to-node voltage VC0 of the capacitor C0 is VC0=0, and the current IL flowing through the inductor L is IL=0, whereas the node-to-node voltage VC1 of the capacitor C1 is VC1=−466 mV (symbol "0") or VC1=466 mV (symbol "1"). Charges QC1 stored in the capacitor C1 is proportional to a potential difference VC1 between both nodes of the capacitor C1. In other words, this initial condition corresponds to a case that the switch 15 is turned off at the time t1 corresponding to the timing Toff shown in FIG. 5B.

Figure 12:
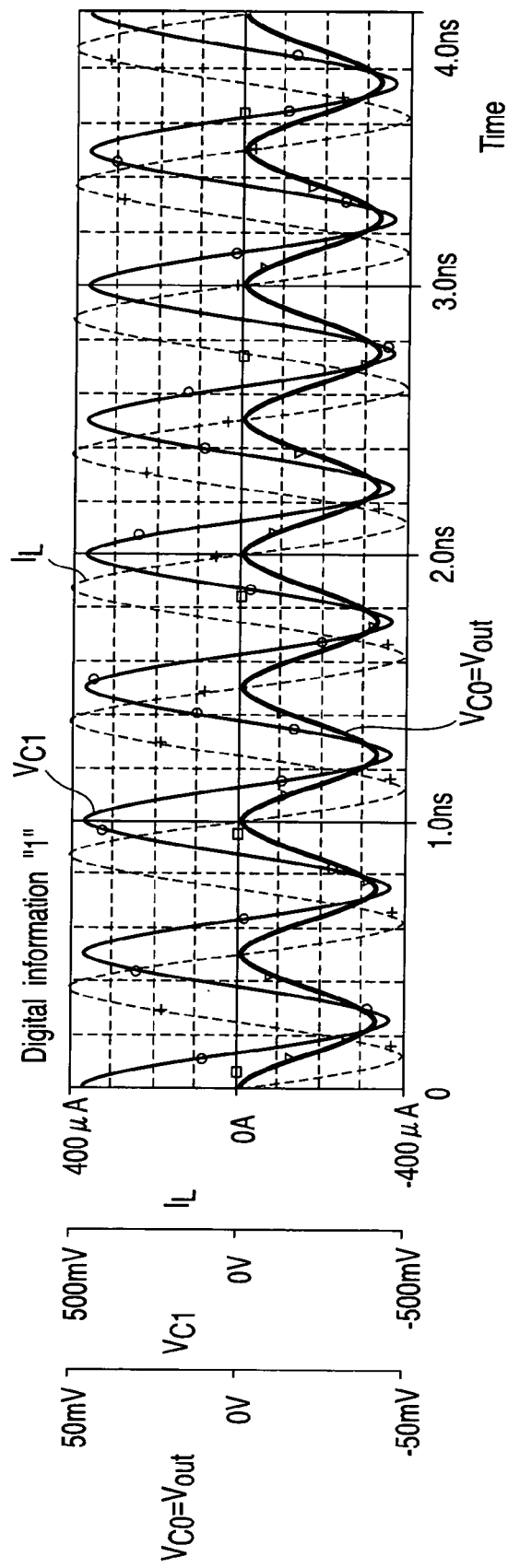
FIG. 12 is a diagram showing waveforms of respective parts of the simulation circuit of FIG. 10 in the case of phase $\phi=\pi$ in the readout mode.

FIGS. 11 and 12 show waveforms of the voltage of the output signal Vout obtained by the simulation circuit of FIG. 10 in the readout mode, the node-to-node voltage VC1 of the capacitor C1 and the current IL flowing through the inductor L. In the readout mode, the waveform of the node-to-node voltage VC0 of the capacitor C0 is equal to the voltage waveform of the output signal Vout. According to FIGS. 11 and 12, since a difference of an initial condition is reflected, the waveform of the node-to-node voltage VC1 of the capacitor C1 and the waveform of the current IL flowing through the inductor L differ by $\phi$=$\pi$ in phase from each other. In contrast, the node-to-node voltage of the capacitor C0 is kept at a substantially constant value of VC0=0, because the other node of the resonator 12 is virtually grounded due to feedback of the differential amplifier 18 and its potential is dropped to a ground potential in effect.

On the other hand, the voltage waveform of the output signal Vout of the differential amplifier 18 is biased by a positive dc voltage in FIG. 11 and by a negative dc voltage in FIG. 12 due to a difference of an initial condition. Accordingly, if the output signal Vout is passed through the lowpass filter 21 to remove a high frequency component from the output signal Vout as shown in FIG. 6, only a dc component of different polarity can be extracted. This dc component corresponds to the symbol "0" or "1" of digital information transmitted by the BPSK signal which is the input signal Vin. As thus described, the digital demodulator of FIG. 1 can reproduce the digital information whose symbol length is 1 bit by demodulating the BPSK signal.

Figure 13:
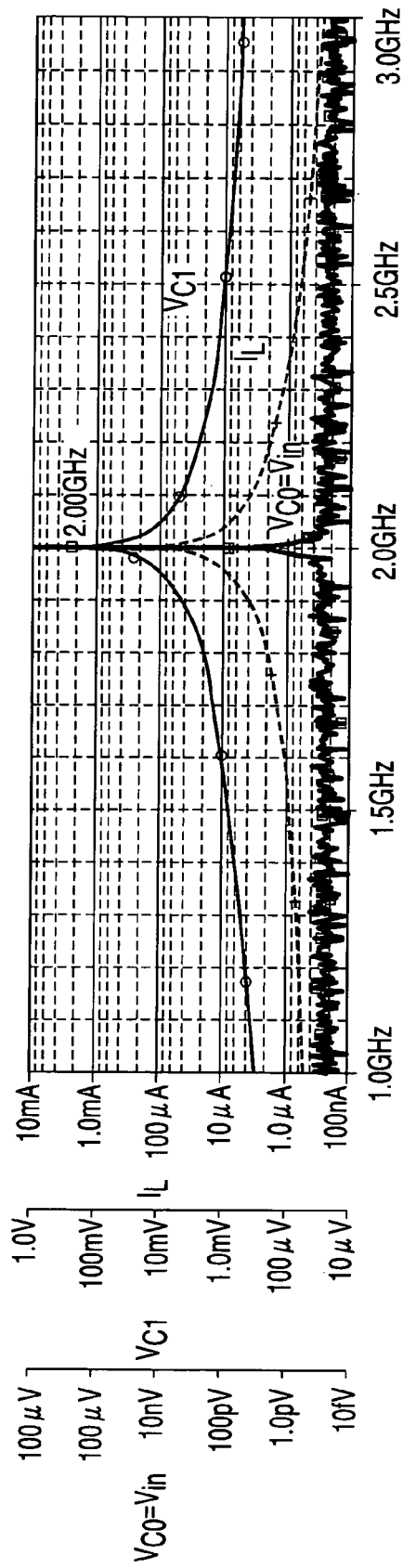
FIG. 13 is a diagram showing frequency spectrums of waveforms of respective parts of the simulation circuit of FIG. 7 in the sampling mode.
Figure 14:
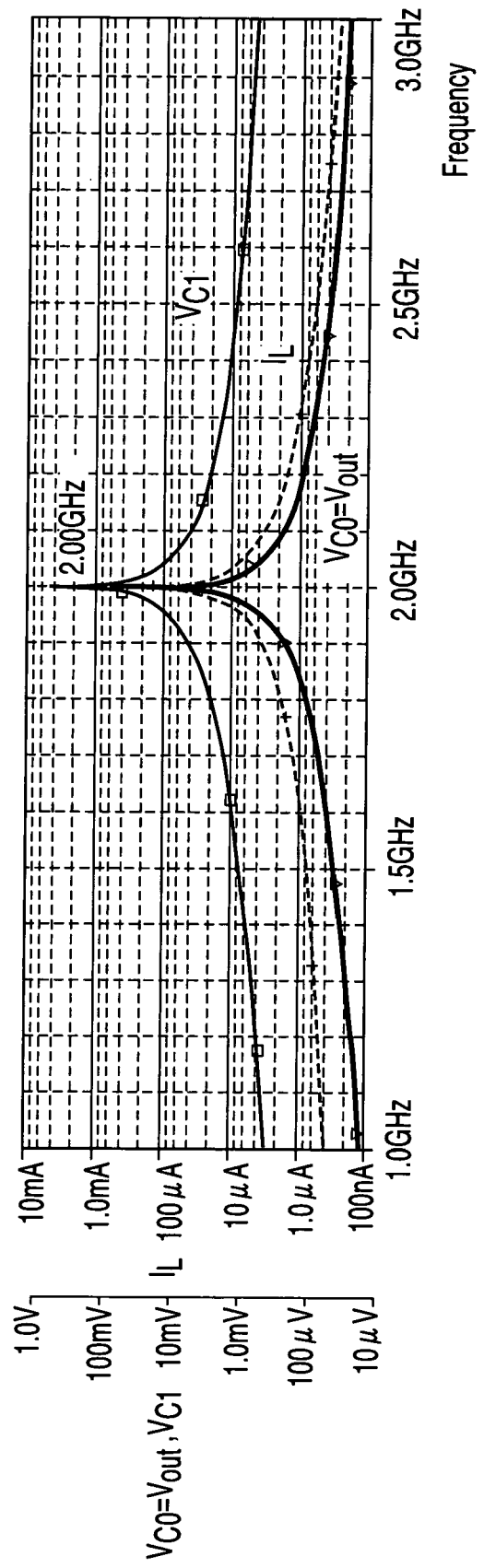
FIG. 14 is a diagram showing frequency spectrums of waveforms of respective parts of the simulation circuit of FIG. 10 in the readout mode.

FIG. 13 shows a frequency spectrum of each waveform of Vin=VC0, VC1 and IL in the circuit of FIG. 4 in the sampling mode. FIG. 14 shows a frequency spectrum of each waveform of Vin=VC0, VC1 and IL in the circuit of FIG. 6 in the readout mode. In FIGS. 13 and 14, each waveform represents a strong peak at 2.00 GHz equal to the series resonating frequency of the resonator 12. As thus described, the digital demodulator of FIG. 1 has high frequency selectivity using the resonator 12 of high Q, so that it can reproduce only a digital phase modulation signal having a desired carrier frequency.

In FIG. 14, a peak of a spectrum appears on a series resonating frequency (2.00 GHz) rather than a parallel resonating frequency (2.04 GHz) of the resonator 12. This is because, in the readout mode, one of two nodes of the resonator 12 is connected to a ground potential and the other is connected to the ground potential in effect due to a feedback operation of the differential amplifier 18, resulting in that both nodes of the resonator 12 are short-circuited. As described above, in the first control mode (sampling mode), the digital demodulator of the present embodiment accumulates charges corresponding to a digital signal modulated by phase shift keying such as a BPSK signal in the resonator 12 to integrate the amplitude of the digital signal. In the second control mode (readout mode), the stored charges of the resonator 12 is moved to the capacitor 19 connected between the input and output nodes of the differential amplifier 18. A voltage signal including a dc component of the polarity corresponding to phase information of a voltage signal corresponding to the stored charges of the resonator 12, namely a signal integrated by the resonator 12 is extracted from the differential amplifier 18.

Figure 15:
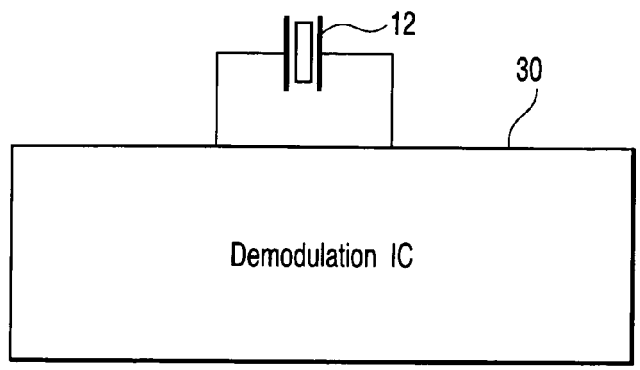
FIG. 15 is a diagram showing a mounting configuration of the digital demodulator of FIG. 1.

Accordingly, a demodulation output signal corresponding to phase change of the modulated signal can be obtained by passing the output signal of the differential amplifier 18 to the lowpass filter 21 to extract a dc component. In other words, it becomes possible to demodulate the digital phase modulation signal with a very simple configuration without using a band selection filter of high frequency band and a channel selection filter of an intermediate frequency band or a down converter, which is required in a conventional demodulator. The demodulator shown in FIG. 1 may be configured in an implementation configuration as shown in FIG. 15. According to this implementation configuration, there is provided a demodulation IC (integrated circuit) 30 in which elements aside from the resonator 12 of FIG. 1 are monolithic-integrated. The resonator 12 is connected to this IC 30 as an external element. The demodulation IC 30 needs not necessarily include all elements aside from the resonator 12 of FIG. 1. For example, a switch controller 20 may be provided in the outside of the demodulation IC 30.

Second Embodiment

Figure 16:
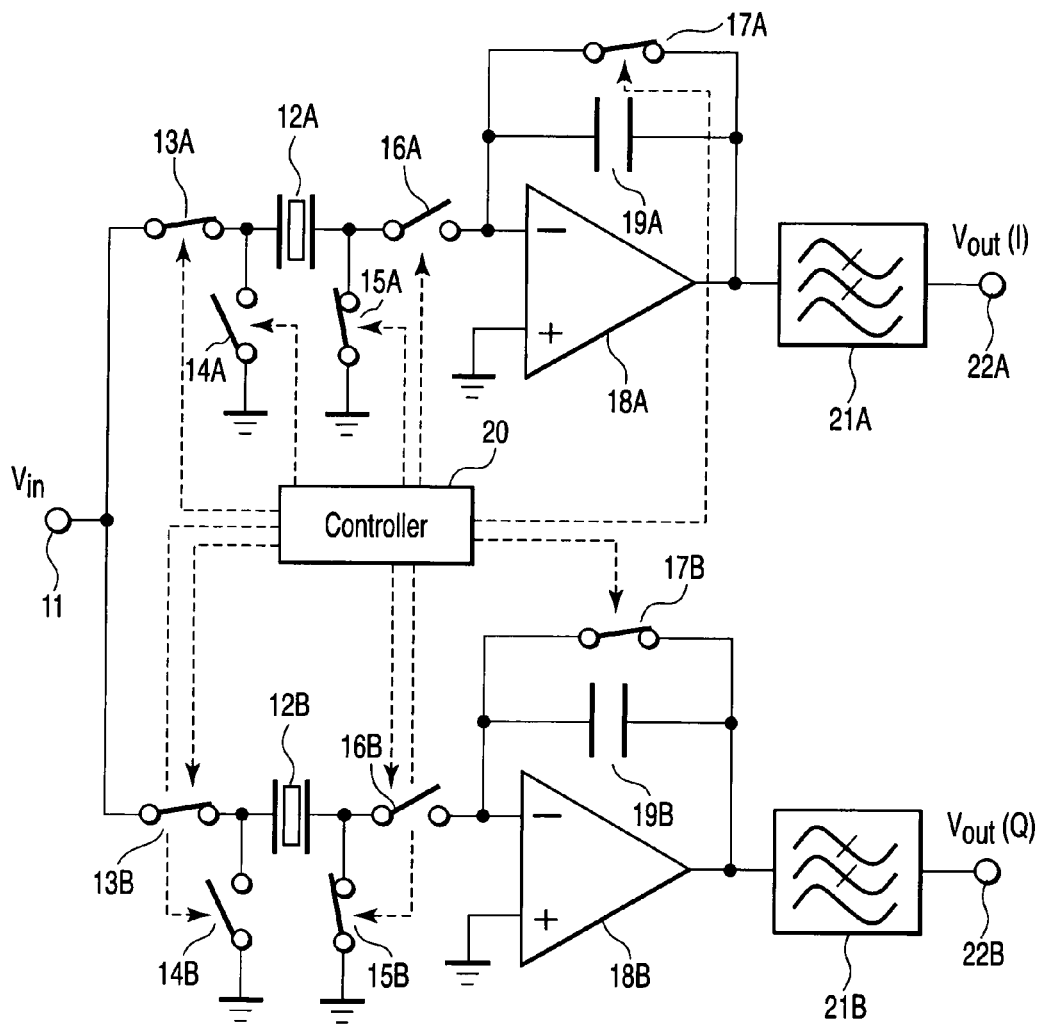
FIG. 16 is a circuit schema of a digital demodulator according to a second embodiment of the present invention.
Figure 17:
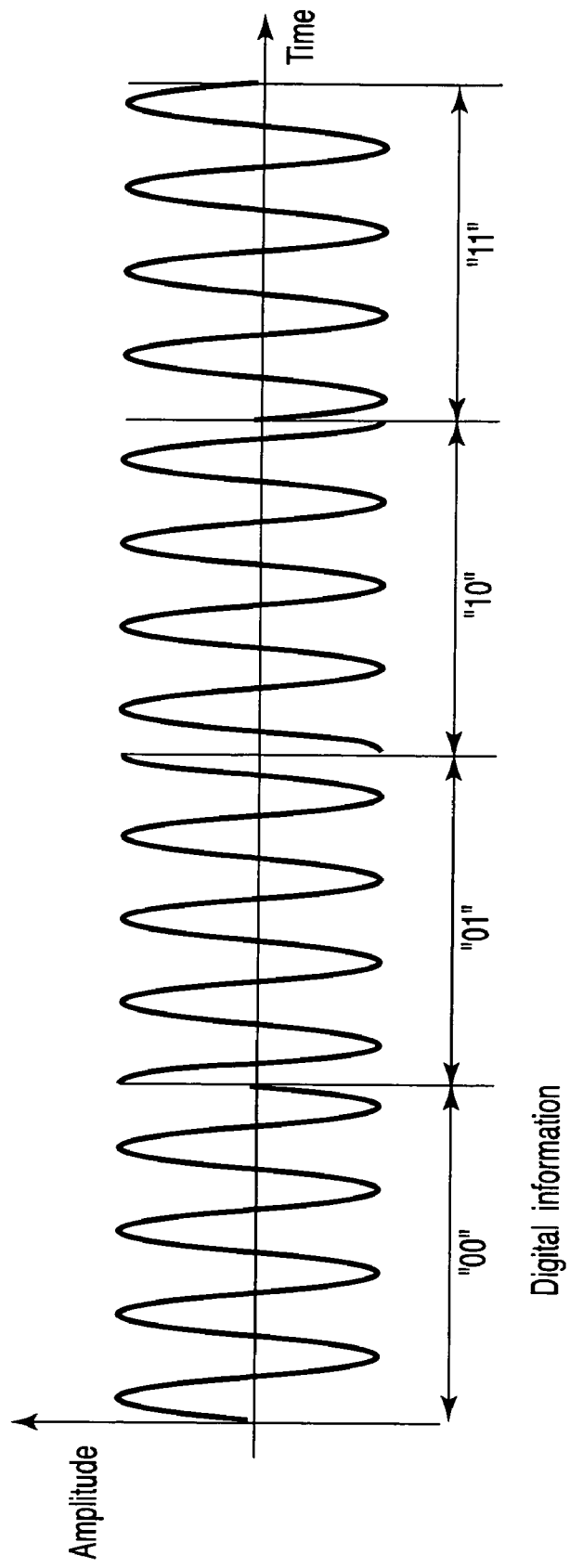
FIG. 17 is a diagram showing an example of a waveform of a QPSK (Quadrature Phase Shift Keying) signal.

A digital demodulator according to the second embodiment of the present invention shown in FIG. 16 is used for demodulating digital information by demodulating a quartet value quadrature phase shift keying (QPSK) signal as shown in FIG. 17, for example. The QPSK signal is demodulated so that the phase of the carrier waves vary in correspondence with 2-bit symbols "00", "01", "10" and "11" of the digital information to be transmitted as shown in FIG. 17.

The digital demodulator of FIG. 16 provides with two unit demodulators for I and Q channels, each of which has a circuit configuration similar to that of the digital demodulator of FIG. 1 according to the first embodiment. A QPSK signal input to a signal input node 11 is input in common to the unit demodulators. In other words, the unit demodulator of I channel comprises a resonator 12A, switches 13A-17A, a differential amplifier 18A, a capacitor 19A, a lowpass filter 21A and a signal output node 22A.

The unit demodulator of Q channel comprises a resonator 12B, switches 13B to 17 B, a differential amplifier 18B, a capacitor 19B, a lowpass filter 21B and a signal output node 22B.

The basic operation of the digital demodulator of FIG. 16 is similar to the digital demodulator of FIG. 1. In other words, at first the switches 13A and 13B, the switches 15A and 15B, and the switches 17A and 17B are turned on by a control signal from the switch controller 20, and the switches 14A and 14B, and the switch 16A and 16B are turned off, thereby to make the unit demodulators of I and Q channels the sampling mode. In the sampling modes, the unit demodulators of the I and Q channels are represented with an equivalent circuit similar to that shown in FIG. 4.

FIG. 17 shows a waveform of the input signal Vin in the sampling mode. FIGS. 18(a), (b), (c) and (d) show waveforms of the input signal Vin and charges QFBAR stored in the resonator 12. The phase of waveform of the input signal Vin varies π/2 by π/2 according to 2-bit symbols "00", "01", "10" and "11" of digital information transmitted by the QPSK signal as shown in FIG. 17 and FIGS. 18(a), (b), (c) and (d). When the frequency of the input signal Vin coincides with the resonance frequency of the resonators 12A and 12B, the resonators 12A and 12B are excited by the input signal Vin. In this time, the amplitude of charges QFBAR gradually increases. The phases of amplitudes of charges QFBAR accumulated in the resonator 12 differ π/2 by π/2 according to the symbols of the digital information like the input signal Vin.

When the amplitude of charges QFBAR becomes large enough, the switches 15A and 15B are turned off by a control signal from the switch controller 20. In this time, the unit demodulators of I and Q channels shift a timing for turning off the switches 15A and 15B by a time corresponding to π/2 in terms of the phase of the carrier waves.

Figure 18:
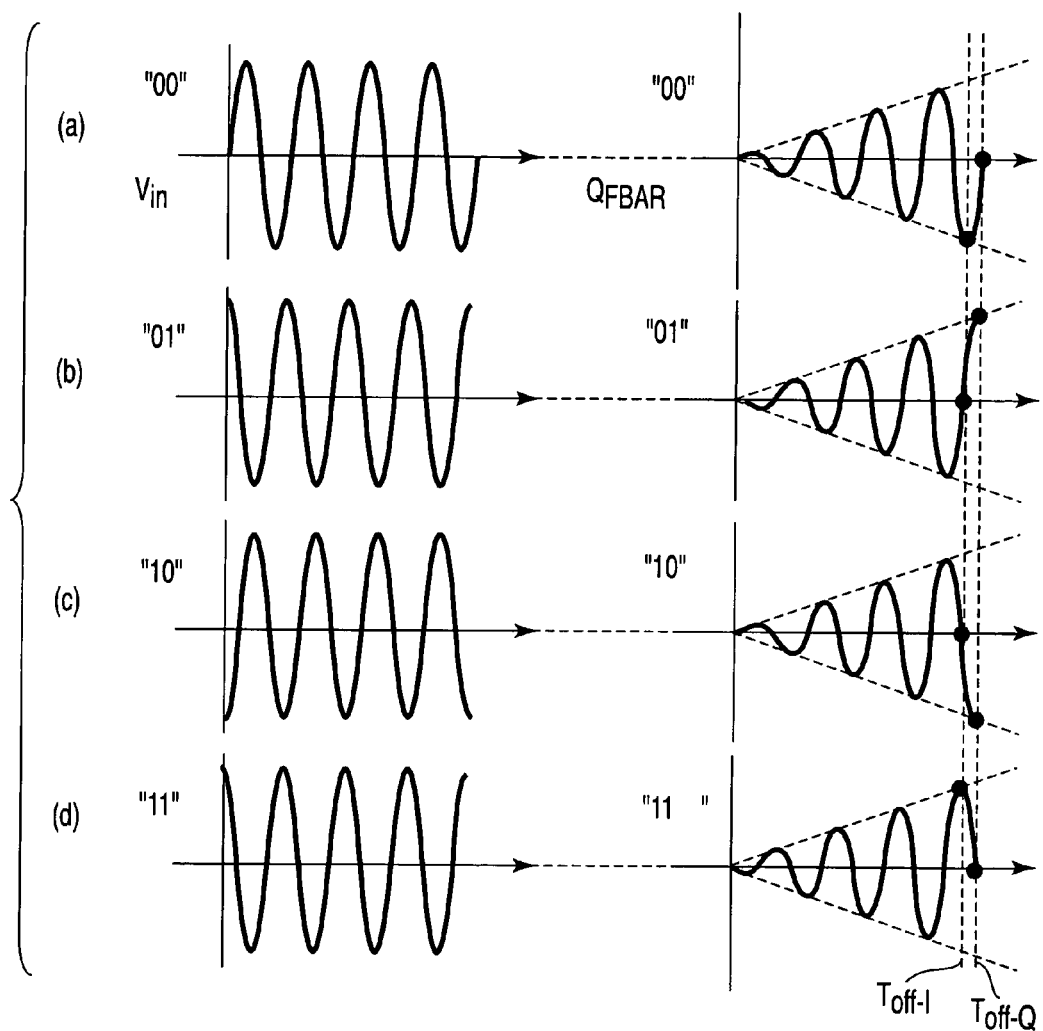
FIG. 18 is a diagram showing an input signal waveform and a waveform of stored charges of a resonator in the sampling mode of the digital demodulator of FIG. 16.

For example, the switch 15A of the unit demodulator of I channel is turned off at a timing shown by Toff=I in FIG. 18, and the switch 15B of the unit demodulator of Q channel is turned off at a timing shown by Toff=Q. As a result, the resonators 12A and 12B are disconnected from the ground potential. At this time, there is not a path for discharging charges stored in the resonators 12A and 12B, so that they are held in the resonators 12A and 12B. Accordingly, even if the piezoelectric vibration of the resonators 12A and 12B damp, a given charge is held in the resonators 12A and 12B. The quantities of charges held in the resonators 12A and 12B differ respectively according to whether which one of the symbols "00", "01", "10" and "11" is the symbol of digital information corresponding to the phase of the input signal Vin.

In the unit demodulator of I channel, when the switch 15A is turned off at a timing indicated by Toff-I in FIG. 18, the resonator 12A remains negative charges for the symbol "00", positive charges for the symbol "11", and does not remain charges for the symbols "01" and "10". On the other hand, in the unit demodulator of Q channel, when the switch 15A is turned off at a timing indicated by Toff-Q in FIG. 18, the resonator 12B remains negative charges for the symbol "10", positive charges for the symbol "01", and does not remain charges for the symbols "00" and "11".

Thereafter, the switches 13A and 13B, and the switches 17A and 17B are turned off by a control signal from the switch controller 20. In this time, both nodes of the resonators 12A and 12B are disconnected from a specific electric potential, and become a floating state with the absolute potential remaining undetermined, so that dc components of the charges (potential difference) remain in the resonators 12A and 12B. The capacitors 19A and 19B are released in a state of zero charge.

Further, the switches 14A and 14B and the switches 16A and 16B are turned on by a control signal from the switch controller 20. In this time, the unit demodulators of I and Q channels become a readout mode together. In the readout mode, the left side nodes of the resonators 12A and 12B are forced to drop to the ground potential. The electric potentials of the right side nodes of the resonators 12A and 12B are virtually grounded to be equal to the ground potential as far as the feedback of the differential amplifiers 18A and 18B normally functions. In other words, the potential difference between both nodes of the resonators 12A and 12B becomes substantially zero, resulting in that the resonators 12A and 12B become a state of zero charge.

On the other hand, because there is not a path for discharging the charges stored in the right side nodes of the resonators 12A and 12B, they move to the capacitors 19A and 19B. The operational amplifiers 18A and 18B output voltages proportional to the charges stored in the capacitors 19A and 19B. Accordingly, when the outputs of the operational amplifiers 18A and 18B are input to lowpass filters 21A and 21B respectively, the lowpass filters 21A and 21B output, as output signals Vout(I) and Vout(Q), dc voltages each having a different value according to symbols "00", "01", "10" or "11" of digital information.

Figure 19A:
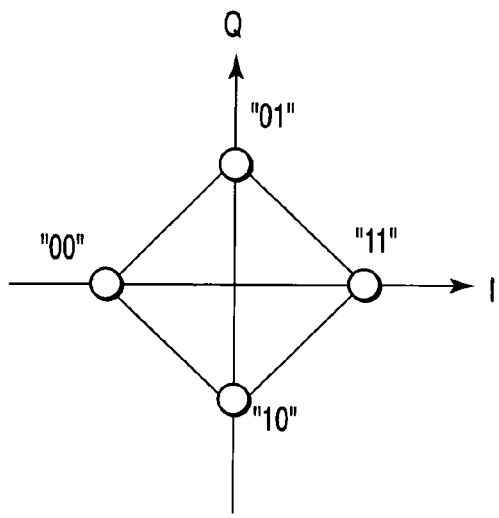
FIGS. 19A and 19B are diagrams showing constellation plotting an output voltage of I channel on a X-axis and an output voltage of Q channel on a Y-axis in relation to an output DC voltage provided for a two-bit symbol "00", "01", "10" or 11".

FIG. 19A shows a so-called constellation map obtained by plotting in an X-axis the output voltage provided with the unit demodulator of I channel with respect to the dc voltage of the output signal Vout provided in correspondence with the symbol "00", "01", "10" or "11", and in a Y-axis the output voltage provided in the unit demodulator of Q channel.

Figure 19B:
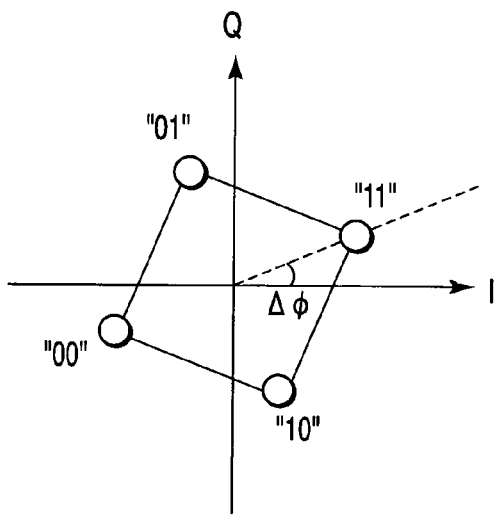

FIG. 19B shows a constellation map that the timing for turning off the switch at the timing described above delays by a time corresponding to $\Delta\phi$ in terms of phase. As thus described, even if a switching timing is off to some extent, distances between the symbols on the constellation map are stored with being equal each other. Accordingly, it is expected that there is not influence in a bit error rate (BER).

The digital demodulator of FIG. 16 is an example applied to a QPSK signal. However, it goes without saying that by increasing the number of unit demodulators further, the digital demodulator of FIG. 6 can be extended to a digital modulator for demodulating a digital phase modulation signal including further many modulation multiple values such as 16-QAM (16 Quadrature Amplitude Modulation), 64-QAM.

Third Embodiment

Figure 20:
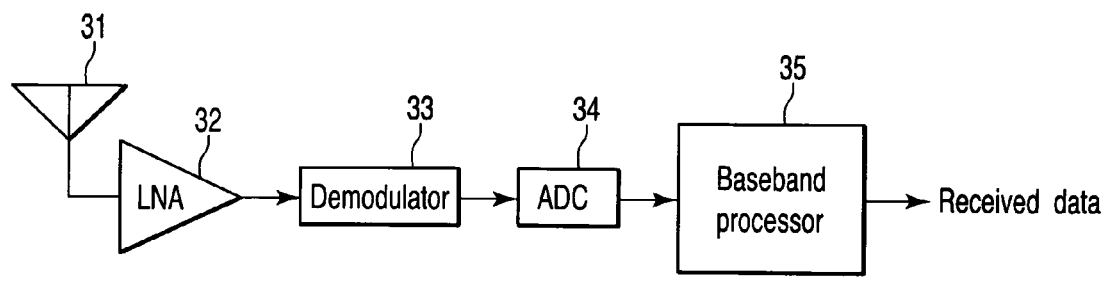
FIG. 20 is a block diagram of a radio receiver according to a third embodiment of the present invention.

A radio receiver including the digital demodulator according to the third embodiment of the present invention is explained referring to FIG. 20. In FIG. 20, a received signal from an antenna 31 receiving a digital phase modulation signal is amplified by a low noise amplifier (LNA) 32. The output signal of the low noise amplifier 32 is input to a digital demodulator 33 having a configuration expanding the first or second embodiment. The output signal of the digital demodulator 33 is converted into a digital signal with a AD converter (ADC) 34 and input it to a baseband process circuit 35 to reproduce received data.

The digital demodulator of the present invention can demodulate a digital phase modulation signal of a desired carrier frequency without using a filter or down converter. Accordingly, the circuit of a wireless receiver can be simplified significantly, resulting in that a low-cost wireless receiver can be realized. Further, since the number of times of sampling a signal decrease, a low power consumption can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital demodulator to demodulate a frequency signal modulated by phase shift keying and having a specific carrier frequency, the digital demodulator comprising:

an input port to which an input signal is supplied;

a resonator having a resonance frequency same as a carrier frequency to store a charge corresponding to a digital signal modulated by phase shift keying and including a high-frequency component;

an input switch connected between an input node of the resonator and the input port to allow electrical disconnection between the input signal and the resonator;

a capacitor to store the charge including the high-frequency component from the resonator;

an amplifier including an input node and an output node between which the capacitor is connected to convert a stored charge of the capacitor into a voltage signal;

a plurality of switches connected between the resonator and the amplifier to switch between a sampling mode for accumulating the charge in the resonator and a readout mode for transferring the charge of the resonator to the capacitor; and a controller to output a control signal for switching between the sampling mode and the readout mode at different timings to the input switch and the switches and to output the voltage signal corresponding to the stored charge of the capacitor from the output node of the amplifier in the readout mode.

2. The digital demodulator according to claim 1, further comprising a lowpass filter to extract a dc component from the output signal of the amplifier to produce a demodulated output digital signal.

3. The digital demodulator according to claim 1, wherein the controller controls the switches to store the charge induced by the frequency signal modulated by phase shift keying in the resonator in the sampling mode to integrate the frequency signal, and to extract a voltage digital signal including a dc component of a polarity corresponding to phase information of the frequency signal modulated by phase shift keying as a voltage digital signal corresponding to the stored charge of the capacitor in the readout mode.

4. The digital demodulator according to claim 1, wherein the switches comprise a first switch connected between a signal input node to which the frequency signal modulated by phase shift keying is input and a first node of the resonator, a second switch connected between a second node of the resonator and a first input node of the amplifier, and a switch control circuit to turn on the first switch and turn off the second switch in the sampling mode, and turn off the first switch and turn on the second switch in the readout mode.

5. The digital demodulator according to claim 1, wherein the switches comprise a first switch connected between an output node of the resonator and an input node of the amplifier, a second switch connected between the input node of the resonator and a reference potential node, a third switch connected between the output node of the resonator and the reference potential node, a fourth switch connected between both nodes of the capacitor, and a switch control circuit to turn on the input switch, turn off the first switch, turn off the second switch, turn on the third switch and turn on the fourth switch, in the sampling mode, and turn off the input switch, turn on the first switch, turn on the second switch, turn off the third switch and turn off the fourth switch, in the readout mode.

6. The digital demodulator according to claim 1, wherein the resonator comprises a thin film piezoelectric resonator.

7. The digital demodulator according to claim 1, wherein the amplifier comprises a differential amplifier including an inverting input node and a noninverting input node connected to a reference potential point, the switches includes a switch connected between the output node of the resonator and the inverting input node of the differential amplifier, and the capacitor is connected between the inverting input node of the differential amplifier and an output node thereof.

8. The digital demodulator according to claim 1, comprising a demodulation integrated circuit device connectable to the resonator, and including the capacitor, the amplifier and the controller which are integrated.

9. A digital demodulator to demodulate a frequency signal modulated by phase shift keying, comprising:
a plurality of unit demodulators each comprising:
an input port to which an input signal is supplied;
a resonator having a resonance frequency same as a carrier frequency to store a charge corresponding to a frequency signal modulated by phase shift keying and including a high-frequency component;
an input switch connected between an input node of the resonator and the input port to allow an electrical disconnection between the input signal and the resonator;
a capacitor to store the charge including the high-frequency component from the resonator;
an amplifier including an input node and an output node between which the capacitor is connected to convert a stored charge of the capacitor into a voltage signal; and
a plurality of switches connected between the resonator and the amplifier to switch between a sampling mode for accumulating the charge in the resonator and a readout mode for transferring the charge of the resonator to the capacitor; and
a controller to output a control signal for switching between the sampling mode and the readout mode at different timings to the input switch and the switches and to output the voltage signal corresponding to the stored charge of the capacitor from the output node of the amplifier in the readout mode, the controller controlling the input switch and the switches of the unit demodulators to change the unit demodulators to the sampling mode and the readout mode at the different timings.

10. The digital demodulator according to claim 9, which the unit demodulators comprise two unit demodulators for I and Q channels to demodulate a quadrature phase shift keying (QPSK) signal including digital information represented by 2-bit symbols "00", "01", "10" and "11".

11. The digital demodulator according to claim 9, wherein each of the unit demodulators further comprises a lowpass filter to extract a dc component from the output signal of the amplifier to produce a demodulated output signal.

12. A wireless receiver comprising
a receiving unit configured to receive a frequency signal modulated by phase shift keying having a specific carrier frequency;
a digital demodulator of to demodulate the frequency signal modulated by phase shift keying, including:
an input port to which an input signal is supplied;
a resonator having a resonance frequency same as a carrier frequency to store a charge corresponding to a frequency signal modulated by phase shift keying and including a high-frequency component;
an input switch connected between an input node of the resonator and the input port to allow an electrical disconnection between the input signal and the resonator;
a capacitor to store the charge including the high-frequency component from the resonator;
an amplifier including an input node and an output node between which the capacitor is connected to convert a stored charge of the capacitor into a voltage signal;
a plurality of switches connected between the resonator and the amplifier to switch between a sampling mode for accumulating the charge in the resonator and a readout mode for transferring the charge of the resonator to the capacitor; and
a controller to output a control signal for switching between the sampling mode and the readout mode at different timings to the input switch and the switches and to output the voltage signal corresponding to the stored charge of the capacitor from the output node of the amplifier in the readout mode;
an AD converter to convert the voltage signal of the digital demodulator into a digital signal; and
a baseband processor to process the digital signal to reproduce receive data.

13. The wireless receiver according to claim 12, further comprising a lowpass filter to extract a dc component from the output signal of the amplifier to produce a demodulated output signal.

14. The wireless receiver according to claim 12, wherein the controller controls the input switch and the switches to store the charge induced by the frequency signal modulated by phase shift keying in the resonator in the sampling mode to integrate the frequency signal, and extract a voltage signal including a dc component of a polarity corresponding to phase information of the integrated frequency signal modulated by phase shift keying as a voltage signal corresponding to the stored charge of the capacitor in the readout mode.

15. The wireless receiver according to claim 12, wherein the switches comprise a first switch connected between an output node of the resonator and a first input node of the amplifier, and a switch control circuit to turn on the input switch and turn off the first switch in the sampling mode, and turn off the input switch and turns on the first switch in the readout mode.

16. The wireless receiver according to claim 12, wherein the switches comprise a first switch connected between an output node of the resonator and an input node of the amplifier, a second switch connected between the input node of the resonator and a reference potential node, a third switch connected between the output node of the resonator and the reference potential node, a fourth switch connected between both nodes of the capacitor, and a switch control circuit to turn on the input switch, turn off the first switch, turn off the second switch, turn on the third switch and turn on the fourth switch, in the sampling mode, and turn off the input switch, turn on the first switch, turn on the second switch, turn off the third and turn off the fourth switch, in the readout mode.

17. The wireless receiver according to claim 12, wherein the resonator comprises a thin film piezoelectric resonator.

18. The wireless receiver according to claim 12, wherein the amplifier comprises a differential amplifier including an inverting input node and a noninverting input node connected to a reference potential point, the switches includes a switch connected between the output node of the resonator and the inverting input node of the differential amplifier, and the capacitor is connected between the inverting input node of the differential amplifier and an output node thereof.

19. The wireless receiver according to claim 12, which comprises a plurality of unit demodulators each comprising the digital demodulator, and wherein the controller controls the switches to change the unit demodulators to the sampling mode and the readout mode at the different timings.

20. The wireless receiver according to claim 12, which the demodulator comprises two unit demodulators for I and Q channels to demodulate a quadrature phase shift keying (QPSK) signal including digital information represented by 2-bit symbols "00", "01", "10" and "11".

* * * * *